United States Patent
Singnurkar (10) Patent No.: US 8,618,867 B2
(45) Date of Patent: Dec. 31, 2013

(54) CONTROLLED CHARGE PUMP ARRANGEMENT AND METHOD FOR CONTROLLING A CLOCKED CHARGE PUMP

(75) Inventor: Pramod Singnurkar, Graz (AT)

(73) Assignee: AMS AG, Unterpremstaetten (AT)

( * ) Notice: Subject to any disclaimer, the term of this patent is extended or adjusted under 35 U.S.C. 154(b) by 127 days.

(21) Appl. No.: 13/120,586

(22) PCT Filed: Sep. 10, 2009

(86) PCT No.: PCT/EP2009/061759
§ 371 (c)(1),
(2), (4) Date: Aug. 2, 2011

(87) PCT Pub. No.: WO2010/034622
PCT Pub. Date: Apr. 1, 2010

(65) Prior Publication Data
US 2011/0279173 A1 Nov. 17, 2011

(30) Foreign Application Priority Data
Sep. 23, 2008 (EP) .................................. 08016695

(51) Int. Cl.
*G05F 1/10* (2006.01)
*G05F 3/02* (2006.01)

(52) U.S. Cl.
USPC ............................................... 327/536

(58) Field of Classification Search
USPC ..................................... 327/536; 363/59–60
See application file for complete search history.

(56) References Cited

U.S. PATENT DOCUMENTS

| | | | | |
|---|---|---|---|---|
| 6,300,839 B1 * | 10/2001 | Bazargan et al. | ............... | 331/57 |
| 6,791,212 B2 * | 9/2004 | Pulvirenti et al. | ............ | 327/536 |
| 7,009,241 B2 * | 3/2006 | Marotta | ........................ | 257/307 |
| 7,176,748 B2 * | 2/2007 | Khouri et al. | ................. | 327/536 |
| 7,253,676 B2 * | 8/2007 | Fukuda et al. | ................. | 327/536 |
| 7,755,417 B2 * | 7/2010 | Suzuki | ......................... | 327/536 |
| 8,198,869 B2 * | 6/2012 | Yang et al. | .................... | 320/166 |
| 2002/0175745 A1 | 11/2002 | Kim | | |
| 2005/0189984 A1 | 9/2005 | Kawagoshi | | |

OTHER PUBLICATIONS

E. Bayer et al., "A high efficiency single-cell cascaded charge pump topology the competitive alternative to inductive boost converters", 32$^{nd}$ Annual IEEE Power Electronics Specialists Conference, vol. 1, pp. 290-295, Jun. 17, 2001.
E. Bayer et al., "Charge pump with Active Cycle regulation-closing the gap between linear-and skip modes", Power Electronics Specialists Conference, vol. 3, pp. 1497-1502, Jun. 18, 2000.

* cited by examiner

*Primary Examiner* — Quan Tra
(74) *Attorney, Agent, or Firm* — McDermott Will & Emery LLP (57) ABSTRACT

A controlled charge pump comprises a clock operated charge pump having an output terminal to provide an output voltage. A first sub-circuit is coupled to the output terminal of the clocked operated charge pump and adapted to provide a first control signal in response to a comparison of the output voltage with a first reference signal. A second sub-circuit is coupled to the clocked operated charge pump and provides a second control signal in response to a comparison of a switch current within the clocked operated charge pump with a second reference signal. A clock skip controller is adapted to control the mode of operation of the clocked operated charge pump in response to that first and second control signals.

14 Claims, 8 Drawing Sheets

CONTROLLED CHARGE PUMP ARRANGEMENT AND METHOD FOR CONTROLLING A CLOCKED CHARGE PUMP

RELATED APPLICATIONS

This is a U.S. national stage of application No. PCT/EP2009/061759, filed on Sep. 10, 2009.

This application claims the priority of European application no. 08016695.2 filed Sep. 23, 2008, the entire content of which is hereby incorporated by reference.

The present invention is related to a clocked charge pump arrangement and to a method for controlling a clocked charge pump.

BACKGROUND OF THE INVENTION

Charge pumps may be utilized to provide an output voltage in several different applications. Often, such output voltage may be higher than a supply voltage driving the charge pump. For this purpose, a charge pump may comprise one or more capacitors which are charged to a specific voltage in response to a clock signal. In a first clock phase of a clock signal, the capacitors are connected to the supply voltage, thereby being charged. In a subsequent clock phase, the charged capacitors are coupled to an output terminal providing the output voltage.

Depending on the circuitry of the charge pump, the output voltage can be higher than the external supply voltage applied to the charge pump. Some charge pumps may also comprise additional switching circuitry, thereby achieving a higher flexibility and different output voltage modes. For instance, a charge pump may operate in a 1:1.5 mode or 1:2 mode, wherein in the first output mode, the output voltage of the charge pump is 1.5 times higher than the supply voltage. In the second output mode, the output voltage is two times higher, accordingly.

Clocked charge pumps normally provide an unregulated output voltage. The output voltage of a clocked charge pump can be regulated and particularly regulated to a value greater than an external supply voltage by driving some of the switches in the first phase of the clock cycle accordingly.

Depending on the load coupled to the output terminal of the clocked charge pump, the current drawn from the charge pump may be different. At the same time, switch losses and current leakages due to switching during operation of the charge pump may result in a quiescent current. To reduce such quiescent current, a new operation mode has been proposed, wherein the clocked charge pump is not operated continuously in response to the clock signal. Moreover, the charge pump is operated not continuously; the driving pulses for the charge pump are generated only in specific clock pulses. Such operation called SKIP mode may be dependent on the voltage drop of the charge pump.

Figure 11:
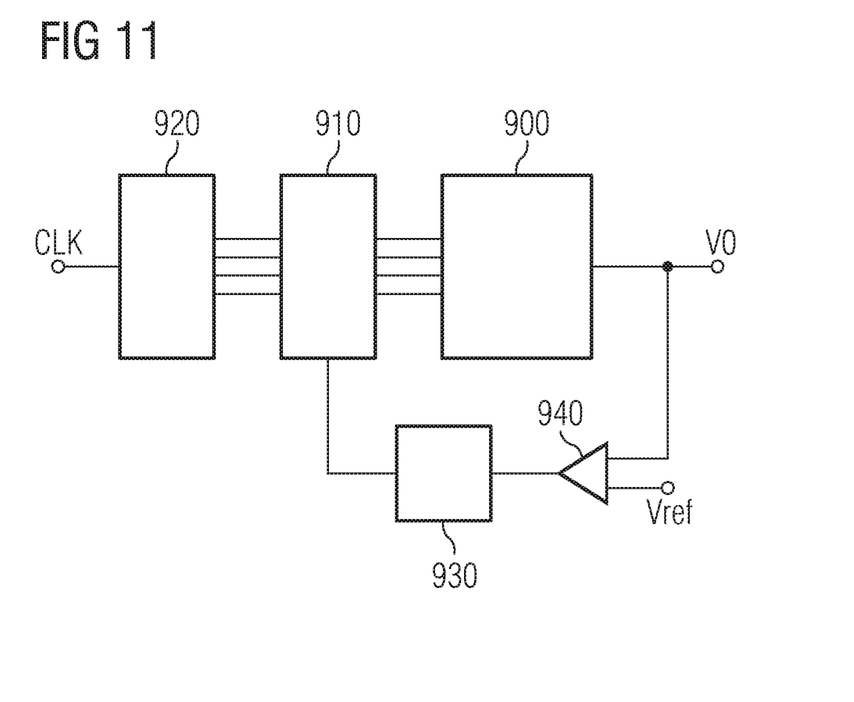
FIG. 11 shows a known charge pump arrangement.

When the load connected to the output terminal of the charge pump is low, the charge pump and particularly the switches of the charge pump may consume a lot of power during the switching process leading to a poor efficiency. For that purpose, the pulses driving the switches are selectively deactivated over two or more periods of the clock signal to reduce the power consumption. FIG. 11 shows a typical charge pump designed to be operated in a continuous mode (CONT mode) or in a non-continuous mode (SKIP mode) dependent on the output voltage.

The charge pump according to FIG. 11 comprises a digital signal generation block 920 connected to a driver circuitry 910. The digital signal generation block 920 receives the clock signal and generates all necessary pulse signals for the charge pump. These digital pulses are generated synchronously with a clock signal applied at the clock input. The driver controller 910 has two different functions. First, it provides signals to drive the switches and second, it is used to regulate the maximum output voltage depending on the mode of operation of the charge pump. The several driving signals are applied to the charge pump 900, the charge pump comprising switches and capacitor arrangements being implemented in such way that a clocked operation in response to the clock signal applied to the input terminal of the digital generation block is possible.

Accordingly, the charge pump switches are switching in each cycle of the clock signal. In other words the driving signals are continuously applied to the charge pump.

To change the operation mode, the output voltage Vo is applied to a voltage comparator 940 and compared to a voltage reference signal Vref. The results are received by a skip controller block 930. The skip controller block may prevent the driving signals from being continuously applied to the charge pump in response to the results. Therefore the skip controller block 930 switches the charge pump between a continuous mode of operation and a SKIP mode of operation, respectively.

However, it is possible that the arrangement may stay in the non-continuous mode of operation, even when the output voltage is low but the load applied to the output terminal of the charge pump is high. In such case, the output voltage may comprise high ripples. To prevent to at least reduce such ripples, additional low pass filtering is necessary, which may slow down the available response of the arrangement.

SUMMARY OF THE INVENTION

One object of the invention is to provide a charge pump arrangement with reduced power consumption but also capable of switching between different modes of operation, if necessary.

Another object of the invention is to provide a method for controlling a clocked charge pump.

These and other objects are attained in accordance with one aspect of the invention directed to a controlled charge pump arrangement, comprising a clocked operated charge pump having an output terminal to provide an output voltage; a first sub-circuit coupled to the output terminal of the clocked operated charge pump and adapted to provide a first control signal in response to a comparison of the output voltage with a first reference signal; a second sub-circuit coupled to the clocked operated charge pump and adapted to provide a second control signal in response to a comparison of a signal with a second reference signal, said signal derived by a switch current within the clocked operated charge pump; and a clock skip controller adapted to control the mode of operation of the clocked operated charge pump in response to said first and second control signals.

Another aspect of the invention is directed to a method for controlling a clocked charge pump, said charge pump comprising an operation mode out of a first mode and a second mode, wherein in the first mode the clocked charge pump is operated continuously with respect to a clock signal and in the second mode the clocked charge pump is operated non-continuously with respect to the clock signal, the method comprising: sensing an output voltage of the clocked charge pump; comparing the output voltage with a first reference signal to provide a first control signal; sensing a switching current of the charge pump during operation of the clocked charge pump; comparing the switching current or a signal derived from the switching current with a second reference signal to provide a second control signal; and changing the operation mode of the clocked charge pump in response to the first and/or second control signals.

One embodiment of the present invention proposes not only to sense the output voltage of a clocked charge pump but also to use current sensing to determine the mode of operation or to decide whether to change from one mode of operation to another.

Particularly, it is proposed to use current sensing during a continuous mode of operation to decide whether to change to a non-continuous mode of operation because in unregulated charge pumps, the output voltage may not be constant. In a non-continuous mode of operation, also called SKIP mode, a voltage sensing along with current sensing may be used to decide whether to change back to a continuous mode of operation.

Voltage and current sensing allow detecting a load change at the output of the charge pump. Particularly, if the unregulated output voltage changes very slowly due to the load applied to the output of the charge pump, a transition to a continuous mode of operation can be achieved in a single clock cycle because of the available current sensing.

In an embodiment, a controlled charge pump arrangement comprises a clocked charge pump having an output terminal to provide an output voltage. A first sub-circuit is coupled to the output terminal of the clocked charge pump and adapted to provide a first control signal in response to a comparison of the output voltage with a first reference signal. A second sub-circuit is coupled to the clocked charge pump and adapted to provide a second control signal in response to a comparison of a signal with a second reference signal. Said signal utilized for the comparison is derived by a switch current within the clocked charge pump. Further, the controlled charge pump arrangement comprises a clock skip controller adapted to control the mode of operation of the clocked charge pump in response to that first and second control signals.

The controlled charge pump arrangement according to the proposed embodiment comprises different modes of operation, in which a first mode of operation represents to a continuously operated charge pump, while a second mode of operation corresponds to a non-continuously operated charge pump. The expression "continuously operated" means that clocked driving signals are continuously applied to the charge pump with respect to a clock signal. As a result, the charge pump is activated and operates during subsequent clock cycles. During a non-continuous mode, the charge pump is activated at specific time intervals. The driving signals are not applied continuously but only at specific time intervals with respect to the clock signal, i.e. every n-th period of the clock signal where n is integer.

The clock skip controller controls the transition between the different modes of operation in response to said first and second control signals, whereas the first control signal is derived by an output voltage sensing and the second control signal is derived by a switch current sensing.

In this respect, the second control signal is not derived directly by the current drawn from the output terminal of the charge pump but derived by a switch current flowing through the charge pump during the charging or discharging period of the capacitors of the clocked charge pump. The switch current may be proportional to the load current drawn from the charge pump.

In one embodiment, the clock skip controller may be adapted to control the provision of a clock signal to the clocked charge pump or to driver circuits for generating clocked driving signals. Alternately, the clock skip controller may control the generation of the clock signal. In a further alternate embodiment, the clock skip controller may selectively activate or deactivate driving signals for switches of the charge pump. In any case, the clock skip controller controls the provision of signals that signals driving the switches of the charge pump directly or used to derive signals driving the charge pump.

In an embodiment, the switch current utilized for the comparison in the second sub-circuit to generate the second control signal is derived by a charge pump capacitor's charging or discharging current. In an alternate embodiment, the switch current is derived by the output current of the charge pump.

The clock skip controller may be adapted to initiate the second mode of operation in response to the second control signal. A first mode of operation may be initiated in response to the first control signal or the second control signal. As mentioned previously, in the first mode of operation, the clocked charge pump is operated continuously with respect to a clock signal and in a second mode of operation; the clocked charge pump is operated non-continuously with respect to the clock signal.

In other words, in the second mode of operation, the clocked charge pump is not operated during one or more clock periods and operated selectively at specific clock periods of the clock signal. For instance, the clocked charge pump is operated every n-th period of the clock signal, wherein n is an integer value greater than 1.

The mode of operation may be controlled by the clock skip controller upon detection of a drop on the output voltage at the output terminal of the charge pump or upon detection of a current drawn from the charge pump.

If a mode operation change, i.e. a transition between different modes s initiated, the transition may be initiated by the clock skip controller synchronously with respect to the clock signal applied to the charge pump arrangement. It is ensured that the transition from the first mode of operation to the second mode of operation or vice-versa does occur within and synchronously to a clock period of the clock signal.

In a further aspect, the charge pump may be implemented with switches and capacitors, said capacitors comprising flying capacitors and reservoir capacitors. To sense the current to the charge pump by the second sub-circuit, the current flowing to one of the flying capacitors during the charging or discharging process is sensed and compared to a second reference signal.

In a further aspect, the clocked charge pump arrangement comprises a de-bounce circuit. The de-bounce circuit comprises a latch to provide a de-bounce time. The de-bounce time may be an integer multiple of the clock period for the transition from the first mode of operation to the second mode of operation. The de-bounce circuit may be further adapted to adjust the transition from the second mode of operation to the first mode of operation always at the start of a low value of the clock signal.

A method for controlling a charge pump arrangement may comprise the step of sensing a current within the charge pump, particularly a switching current and comparing the sensed current with a reference current. In an aspect of the invention, an average current is sensed and compared to an average reference current. If the sense current or the average sensed current is smaller than the respective reference current or the averaged reference current, a clocked charge pump can be operated non-continuously. Accordingly, a transition is initiated from a continuous mode of operation to a non-continuous mode of operation.

If the sensed current or the averaged sensed current is higher than the respective reference current or averaged reference current, then the clocked charge pump should be operated continuously. Accordingly, a transition from a non-continuous mode of operation of the charge pump to a continuous mode of operation of the charge pump is initiated.

A transition may also be initiated if the current output voltage plus the reference voltage is smaller than a previously detected output voltage. Such behavior occurs when a sudden applied load reduces the output voltage.

According to the proposed method, a transition from a continuous mode of operation to a non-continuous mode of operation is executed in response to a current sensed value. Accordingly, such transition is independent of output voltage ripples and therefore, the charge pump does not need to be regulated.

A transition from a non-continuous mode of operation to a continuous mode of operation is initiated either in response to a voltage drop on the output terminal of the charge pump or an increase of the load applied to the charge pump. During a non-continuous mode of operation, a sudden application of load is detected by voltage sensing. Such load will reduce the output voltage below a threshold value, which is detected. Upon such detection, the transition to a continuous mode of operation is initiated and the clocked charge pump is operated continuously. A slow application of load will still be detected by the respective current sensing.

In either case, the transition from a non-continuous mode of operation to a continuous mode of operation will take place within one clock cycle. Accordingly, the clocked charge pump is operated continuously or non-continuously in response to two control signals, a first control signal giving information about output voltage variations and a second control signal presenting information about a switching current charging or discharging the charge pump capacitors.

In an embodiment, it may be useful to delay the transition from a continuous mode of operation to a non-continuous mode of operation.

DETAILED DESCRIPTION OF THE DRAWINGS

In the following detailed description, several aspects of the present invention are explained in greater detail with reference to the accompanying drawings. However, those features shown in the figures are not restricted to the respective embodiments, but can be combined in different ways by a person skilled in the art. The switches for the clocked charge pump as well for other sub-circuits of the arrangement according to the present invention are implemented by field-effect transistors for illustration purposes only. However, those switches are not restricted to field-effect transistors, but can be implemented in different ways. The clocked charge pump can be implemented in various ways and is therefore not restricted to the exemplary embodiment shown herein.

Some sub-circuits or elements are represented enlarged with respect to other elements. Such enlargement is for illustration purposes and does not reflect differences in real size when implementing those elements. The circuits and sub-circuits shown herein can be implemented in a single semiconductor body as an integrated circuit or as separated circuits using integrated as well as discrete components and devices.

Figure 1A:
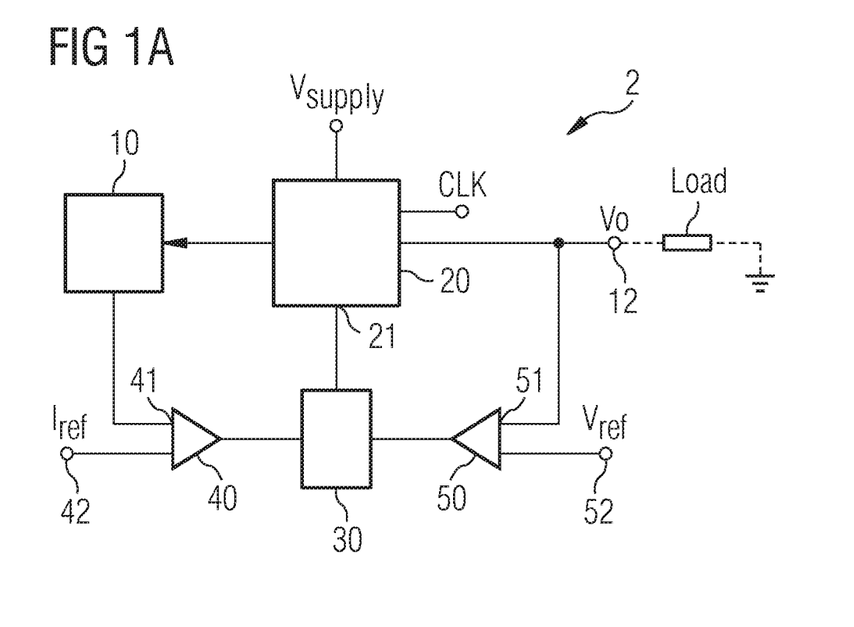
FIGS. 1A, 1B show an embodiment of a controlled charge pump arrangement.

FIG. 1A shows an embodiment of a proposed controlled charge pump arrangement. The charge pump arrangement 2 comprises a charge pump device 20 including all digital signal generation circuitry and the respective driver circuitry. Charge pump 20 comprises a clock input terminal on which a clock signal is provided and a supply terminal for receiving the supply voltage Vsupply.

Charge pump 20 can be operated in two different modes of operation. In a first mode, called continuous mode (CONT-MODE), the charge pump operates continuously with respect to the clock signal provided at the clock input terminal. In other words, the digital signal generation block within the charge pump 20 generates the driving pulses to the driver circuitry and to the charge pump circuitry continuously for each period of clock signal CLK.

In a second mode of operation, called SKIP mode, the charge pump is not operated continuously with respect to the clock signal CLK. In the SKIP mode, driving pulses are generated only at specific periods of clock signal CLK, for example each n-th period. During the SKIP mode, when switches are not driven, all driving signals for the switches are at low level, thereby preventing any switches to be turned on accidentally. During SKIP mode, no additional leakage power is consumed by the charge pump. Further, energy stored in output capacitors of the charge pump are not dissipated due to a leakage current through the switches.

Charge pump 20 comprises an output terminal 12 on which a regulated or unregulated output voltage Vo is provided. The output terminal is normally connected to a load as indicated in FIG. 1A. The load may comprise constant or varying impedance. Accordingly, the output voltage at terminal 12 drops in dependence on the current drawn by the load connected to the output terminal 12.

If the load is quite small, meaning that the resistance or impedance of the load is high, the voltage drop is also low. In such cases, the charge pump, and particularly the switches of the charge pump, can be deactivated as long as the output voltage does not drop below a threshold.

If, on the other hand, the load applied to the output terminal is high, meaning the resistance of the load is very low, a high current may be drawn from the charge pump. Accordingly, the voltage drop at the output terminal of the charge pump may be fast. Therefore, the charge pump may be run continuously, charging internal capacitors with each clock cycle of clock signal CLK to provide the required current and charge at output terminal 12.

To determine the preferred mode of operation, the output voltage Vo of the charge pump at terminal 12 is sensed by the comparator 50 and compared to a voltage reference signal at terminal 52. In addition to the voltage sensing, a current flowing through the switches charging or discharging the charge pump capacitors is also sensed. For this purpose, charge pump 20 is operatively connected to switch current sensing means 10. The result of the switch current sensing means 10 is provided at terminal 41 of a second comparator 40 to be compared with a current reference signal Iref.

Both comparators 40 and 50 are coupled to a skip controller 30. Skip controller 30 determines the mode of operation and initiates the transition between the two different modes of operation of the charge pump 20. For that purpose, the skip controller provides several control signals to the charge pump 20 at terminal 21. The control signals are synchronized to the clock signal CLK to provide a smooth transition between the modes of operation. Depending on the results provided by comparators 40 and 50, charge pump 20 is selectively switched between the continuous mode of operation CONT MODE and the non-continuous mode of operation SKIP MODE.

In summary, skip controller 30 along with the voltage and current sensing means is adapted to control the skipping of driving pulses at low loads applied to the output terminal 12 of the charge pump. The combined methods of current sensing and voltage sensing achieve a simplified fast response and allow a fast transition from SKIP mode to CONT mode and vice versa. The transitions themselves are independent to output voltage ripples and at the same time synchronous to the clock signal CLK.

Figure 1B:
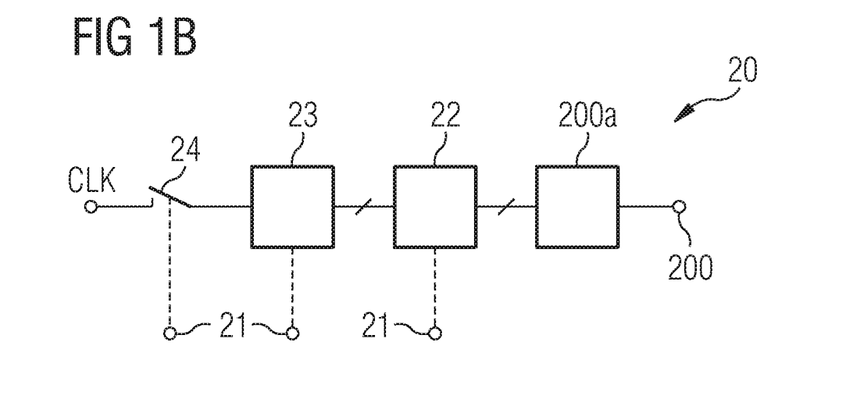

FIG. 1B shows several possible embodiments and alternatives to selectively set the clocked charge pump 200a of the charge pump 20 into a continuous or non-continuous mode of operation. For instance, skip controller 30 may control a switch 24 to selectively couple or decouple digital signal generation block 23 and driver circuit block 22 from the clock signal CLK.

As an alternative, skip controller 30 may provide respective control signals to the digital signal generation block 23. As a further alternative, skip controller 30 may provide respective control signals at terminal 21 to the driver circuit block 22. In each case, control signals provided by skip controller 30 are synchronous to clock signal CLK, thereby achieving the smooth transition between the different modes of operation within a clock period of clock signal CLK.

Figure 2:
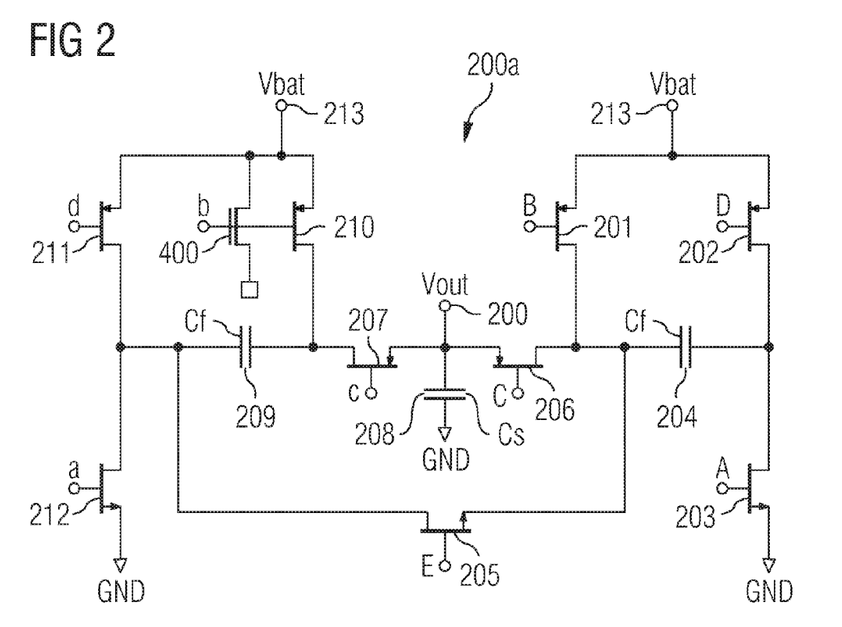
FIG. 2 shows an embodiment of a clocked charge pump.

An embodiment of a clocked charge pump 200a including several switches, on which the respective switching signals are applied is illustrated in FIG. 2. In this embodiment, charge pump 200a provides different voltage output modes to boost an externally applied supply voltage Vbat. Charge pump 200a comprises two flying capacitors 209, 204 with fixed capacitance Cf. A first terminal of respective "flying" capacitors 209, 204 is connected between switching transistors 211, 212 and 202, 203, respectively. Switches 211 and 202 are connected to the supply voltage terminal 213 for providing the supply voltage Vbat. In accordance, transistors 212 and 203 are coupled with their second terminals to ground potential GND.

Respective second terminals of the flying capacitors 209 and 204 are connected to switching transistors 210 and 201, respectively. The switching transistors 210, 201 are also coupled to the common supply terminal 213. The second terminals of the flying capacitors 209, 204 are also connected to respective output switching transistors 207 and 206. Respective second terminals of output switching transistors 207, 206 are connected to a common output terminal 200 and to a storage capacitor 208 with capacitance Cs.

In this embodiment, clocked charge pump 200a also comprises a selection transistor 205 for selecting different output voltage modes during operation of the clocked charge pump 200a. Selection transistor 205 is coupled with a first terminal to the first terminal of flying capacitor 209 and with its second terminal to the second terminal of flying capacitor 204.

As mentioned before, charge pump 200a can be used for boosting the supply voltage Vbat to an output voltage Vout, the output voltage Vout being a factor 1.5 or 2 times higher than the input voltage Vbat.

In a so-called "1.5 mode of operation", the switches 210, 203 and the mode switch transistor 205 are set to ON during a first clock period $T_1$. This is achieved by applying signal b with low logical level at the control terminal of transistor 210 while at the same time applying signals A and E with high logical levels at the respective gate terminals of switching transistor 205 and 203. All remaining switching are in OFF state. During first period $T_1$, both capacitors 209 and 204 are charged to the total supply voltage of Vbat. If the capacitors are matched approximately, an equal voltage drop across both flying capacitors is provided.

During a subsequent second clock period $T_2$, switching transistors 210, 205 and 203 are opened and switches 211, 202 are closed as well as output switches 207 and 206. Any charge stored in flying capacitors 209, 204 is now transferred to storage capacitor 208. A current is supplied to output terminal 200.

Figure 3A:
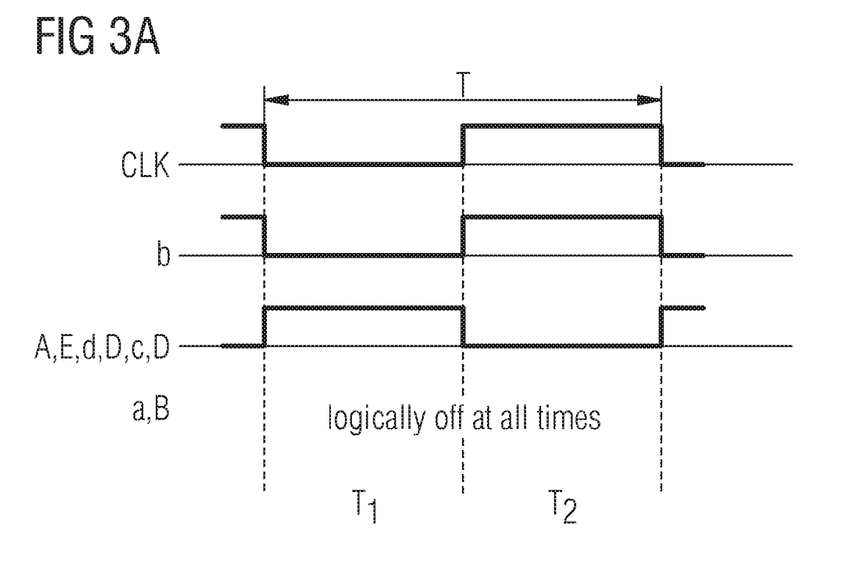
FIGS. 3A, 3B illustrate the several control signals applied to the clocked charge pump during different output modes.

The control signals b, A, E, d, D, c and C applied to the switches during a clock cycle of the signal clock CLK are shown in FIG. 3A. Signals a, B at switches 212, 201 are adjusted in such way that the respective switches are switched off at all times. The output voltage at the terminal 200 is about 1.5 times the supply voltage Vbat, also considering the load current at terminal 200, the switching resistance of the several transistors, the switching frequency as well as the node leakages.

Figure 3B:
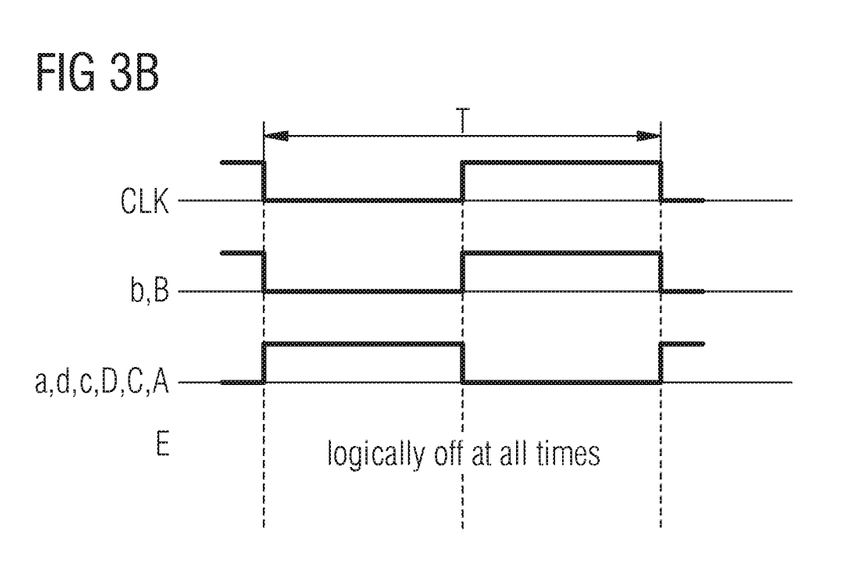

FIG. 3B illustrates the level of signals for the respective switches for the second output mode in which the output voltage Vout at terminal 200 is about two times higher than the input voltage Vbat.

In this output mode, switch 205 is permanently deactivated. During a first phase $T_1$ of clock cycle CLK, switches 210, 201 as well as 212, 203 are closed, thereby charging each of the flying capacitors 209, 204 to the supply voltage Vbat. In the second clock phase $T_2$, switches 210, 201, 212 and 203 are opened and switches 211 and 202 as well output switches 207, 206 are closed. Any charge stored in flying capacitors 209, 204 is transferred to output capacitor and to terminal 200.

The charge pump 200a according to the embodiment of FIG. 2 may provide an unregulated output voltage, but can be regulated also to a value greater than Vbat by driving transistors 211 and 212 into a saturated region instead of operating the transistors in their linear region only.

During operation, the charge stored in flying capacitors 204, 209 is provided at the output terminal. Consequently, any load applied to the output terminal draws the current from the charge pump, thereby reducing the charge on the flying capacitors. During the charging period $T_1$ of the clock cycle, the "lost" current on capacitors 204, 209 is restored by a respective switch current through switching transistors 210 and 201. Accordingly, any current drawn by a load corresponds to a respective switching current. Charge pump 200a shown in the embodiment of FIG. 2 is therefore operatively coupled to a switching current means 400. The current means comprise a switching transistor which is driven by the same signal b also applied to the switching transistor 210.

Figure 5:
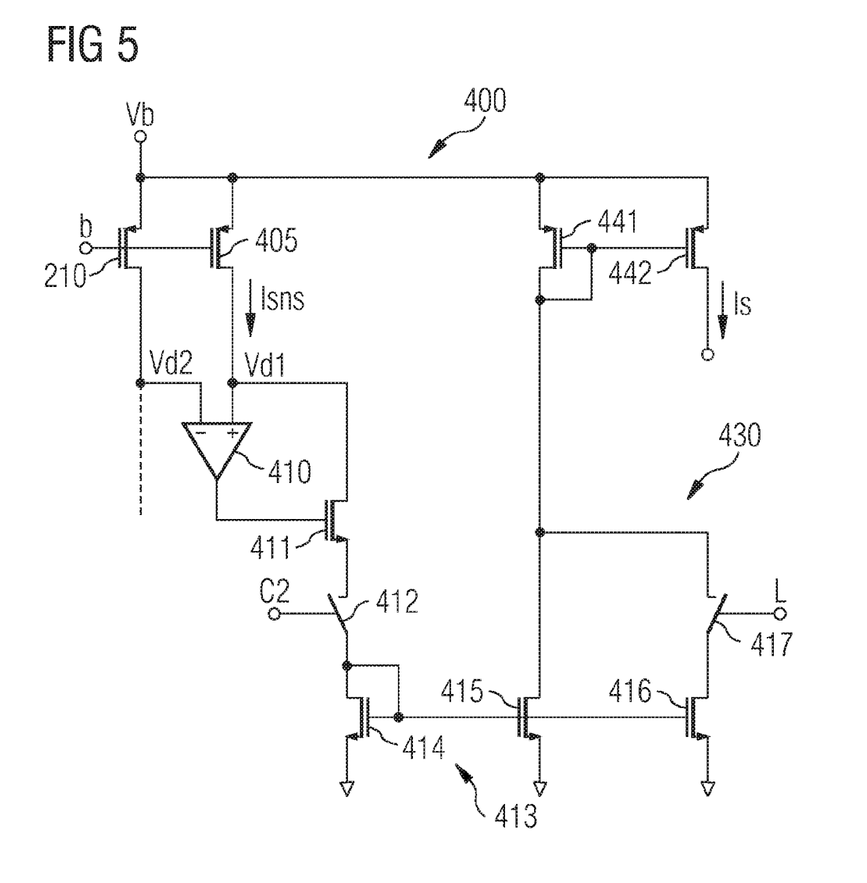
FIG. 5 shows a detailed view of the current sensing sub-circuit.

FIG. 5 shows a detailed view of the current sensing means according to an embodiment. Current sensing transistor 405 is connected with its gate terminal to the control terminal for receiving the control signal b. Accordingly, a sensing current Isns flows through current sensing transistor 405 during first clock phase $T_1$ in each output operation mode. The second terminal of current sensing transistor 405 is connected to a non-inverting input of comparator 410. The inverting input of comparator 410 is coupled to the second terminal of switch 210 of charge pump 200*a*. The output of comparator 410 is applied to a gate of a further transistor 41, also connected to current sensing transistor 405. Transistor 411 and comparator 410 are used to form a voltage equalizing network to equalize voltage Vd2 of charge pump 200*a* to the internal voltage Vd1.

Transistor 411 is coupled to switch 412, whose purpose will be explained later in detail with respect to FIG. 4. Switch 412 is connected to current mirror 413 comprising a current mirror transistor 414 and two output transistors 415, 416, respectively. The second output transistor 416 is connected to the first output transistor via switch 417. Output transistors 415, 416 and switch 417 are used to build a hysteresis control network. It is operated during a transition from a non-continuous mode of operation of the charge pump to a continuous mode of operation of the charge pump.

In other words, switch 417 controls the sensing current during transition from SKIP mode to CONT mode of the charge pump. The hysteresis control 430 is coupled with its output to a further current minor consisting of current minor transistor 441 and output transistor 442. At the second terminal of output transistors 442, the sensing current Is is provided.

Figure 4:
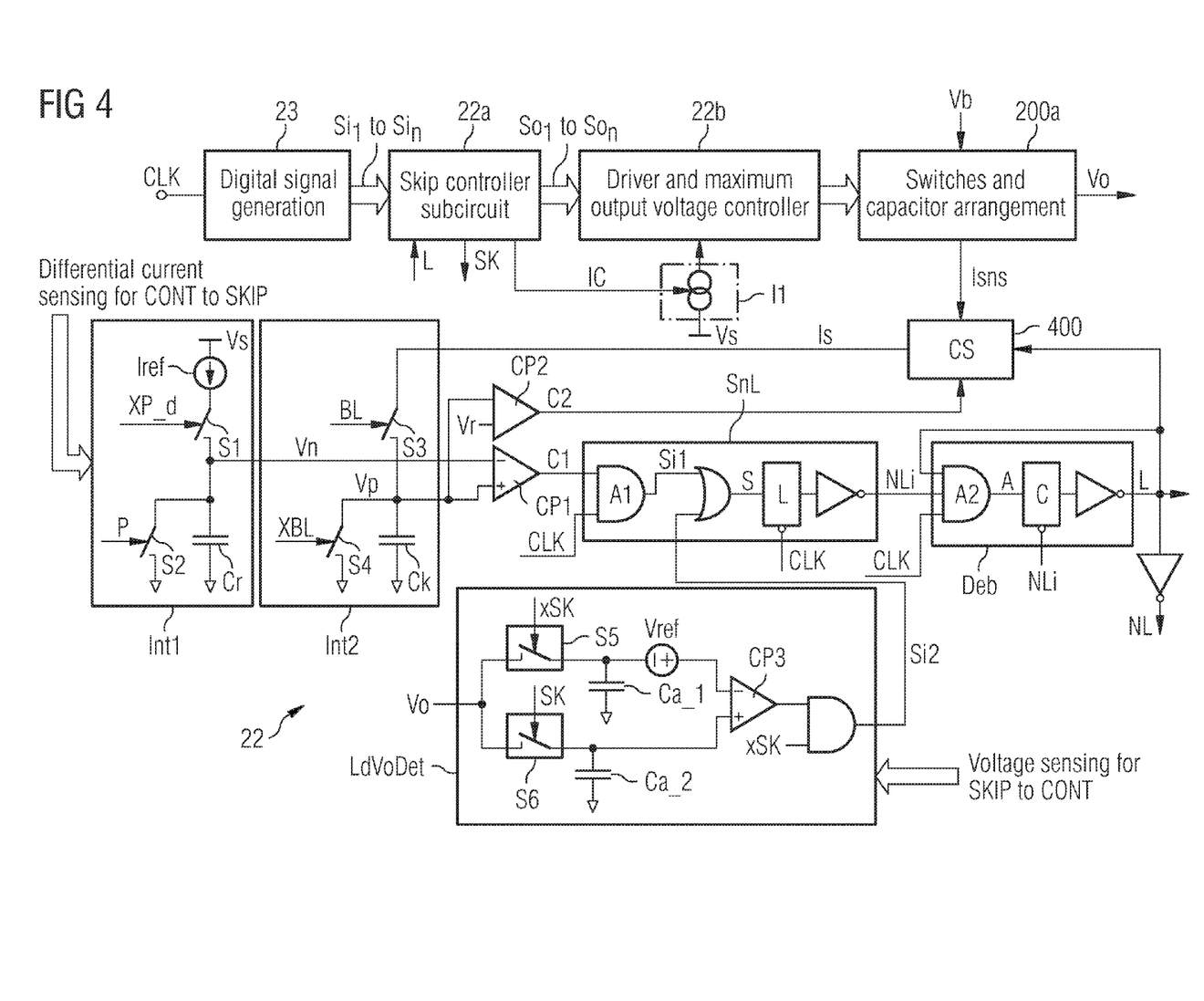
FIG. 4 shows a detailed view of the skip controller of the controlled charge pump arrangement.

FIG. 4 illustrates an embodiment of a controlled charge pump arrangement according to the present invention. For illustration purposes, some sub-circuits being part of the skip controller block are shown in greater detail.

The controlled charge pump arrangement comprises a digital signal generation block 23 coupled to a skip controller sub-circuit block 22*a*. Digital signal generation block 23 receives a clock signal CLK and generates a plurality of digital control signals $Si_1$ to $Si_n$. Those control signals are applied to skip controller sub-circuit 22*a*, which will be explained later with respect to FIG. 6. Skip controller sub-circuit 22*a* provides control output signals $So_1$ to $So_n$ to a driver and output voltage controller 22*b*. The driver at output voltage controller 22*b* generates the respective driving and switching signals for switches arranged in the clocked charge pump 22.

The controlled charge pump arrangement comprises two different modes of operation, a first continuous mode called CONT mode and a non-continuous mode with respect to the clock signal called SKIP mode. The determination and decision which mode of operation is to be initiated and executed is made using several sub-circuit blocks shown in FIG. 4, those sub-circuit blocks being part of the skip controller 22.

As previously described with respect to FIG. 5, the current sensing means 400 provide a current sensing output signal Is applied to an integrator block Int2. The integrator Int2 comprises a switch S3 being arranged between the output terminal of current sensing means 400 and capacitor Ck and switch S4, respectively. Switches S3 and S4 are used to prevent the integration of currents which exceed a predetermined threshold value. Switch S3, when closed, charges the capacitor Ck if S4 is open. If S3 is open and S4 is closed, then capacitor Ck is discharged to ground potential.

For this purpose, a comparator CP2 is provided comparing a voltage signal Vp derived by the integrated current via capacitor Ck to a reference signal Vr. The result is the control signal C2, which is provided at switch 412 of a current sensing means 400. If the voltage signal corresponding to the integrated current Is applied to the comparator CP2 exceeds the threshold value given by Vr, the current sensing means are deactivated by opening switch 412. Comparator CP2 therefore prevents the sensing of very high currents and "clamps" the integrated signal Vp to a specific value.

A second integration sub-circuit Int1 is used to generate a reference signal Vn corresponding to the reference current. Integration sub-circuit Int1 comprises a current source Iref. The current source Iref is coupled via switch S1 with reference capacitor Cr and switch S2. Switches S1 and S2 are operated in response to pulse signals P, XP_d (inverted signal of P). Signals P and XP_d are generated from clock signal CLK and shown in greater detail in FIG. 8. As a result, Vn is generated if switch S1 is closed, thereby charging capacitor Cr with the current Iref. In a subsequent phase, capacitor Cr is discharged by closing switch S2 while opening switch S1.

Voltage signal Vn corresponding to the reference current Iref as well as signal Vp corresponding to the sensed current Is are applied to comparator CP1 to provide the result signal C1. The result C1 is provided to the next sub-circuit block SnL. Sub-circuit block SnL provides strobe and latches for the comparator output C1. The sub-circuit SnL comprises a logic AND gate A1 coupled to the clock signal CLK and to the comparator output.

The output Si1 of the logic AND gate A1 is received by a logic OR gate which is connected upstream to a latch circuit L, said latch circuit clocked by the clock signal CLK. The output of the latch circuit is inverted to provide the output signal NLi to a de-bounce sub-circuit Deb.

De-bounce sub-circuit comprises a second logic gate A2 with three input terminals. A first input terminal receives the clock signal CLK, a second is connected to the output of the sub-circuit SnL and a third input terminal to the respective output terminal of the de-bounce sub-circuit. The logic gate A2 is connected downstream to a delay circuit C, the delay circuit being adjustable in response to the output signal L of sub-circuit SnL.

If the output signal NLi of the sub-circuit SnL is at high level, the delay circuit C delays the signal A at its input and provides a delayed signal at its output terminal. If the output signal NLi of the sub-circuit SnL is low, then the signal applied to the input of the delay circuit C is provided directly at the output of the delay circuit C, which is further inverted to produce L.

A further sub-circuit block LdVoDet is used for voltage sensing to determine a transition from the non-continuous SKIP mode to the continuous mode. For this purpose, sub-circuit block LdVoDet receives the output voltage of the clocked charge pump 200*a*. Two switches S5 and S2, respectively, are connected to a respective capacitor Ca1 and Ca2. Capacitor Ca1 is arranged between switch S5 and a reference voltage source Vref. Capacitor Ca2 is connected to switch S6 and to a non-inverting input of a comparator CP3. The inverting input of comparator CP3 is connected to the output of voltage reference source Vref. Finally, a logic AND gate is connected with a first input terminal to the output of comparator CP3. At its second terminal, it receives a signal xSK (inverted signal of SK) indicating the mode of operation. Signal SK is high if a non-continuous mode (SKIP mode) of the controlled charge pump arrangement is entered. Accordingly, xSK is at low level.

During continuous mode of operation, switch S6 is closed charging capacitor Ca2 to the output voltage Vo. If the SKIP mode or non-continuous mode of operation is entered, switch S6 is opened. Capacitor Ca2 hold its states and the output voltage Vo of the previous CONT mode. Switch S5 is closed charging capacitor Ca1 to the current output voltage Vo. Comparator CP3 now compares the previous output voltage Vo, SK equals 1 with the current output voltage Vo Vref.

A sudden applied load can reduce current output voltage so that $Vo(\text{when } xSK=1) + Vref < Vo(\text{when } SK=1).$ As a result, the output of comparator CP3 will go to high level. Accordingly, Si2 will rise to high level as well, because xSK equals 1 too.

Referring now to operation of the sub-circuit SnL. If clock signal CLK is high and comparator output C1 is high as well, the output of logic gate A1 will go high. As a result, the output signal NLi of the sub-circuit block SnL will become low at the next clock edge because the latch L is clocked with clock signal CLK.

Alternately, the output signal NLi will also switch to low at the next clock edge if signal Si2 from voltage sensing sub-circuit block LdVoDet is high level. If in one half-cycle of clock signal CLK, the comparator output signal C1 is never high and at the same time, signal Si2 of the voltage sensing block LdVoDet is low, then the output signal NLi of the sub-circuit block SnL will be high at the end of the clock signal's high state.

The de-bounce sub-circuit Deb provides a de-bounce time for transition from the continuous mode of operation to the non-continuous mode of operation.

The de-bounce time is always an integer factor of the period T of clock signal CLK and given by n*T, wherein n is an integer value. A transition from the non-continuous SKIP mode to the continuous mode of operation is indicated by a transition of signal L from low to high state. That transition is always at the start of a low clock level CLK. As explained earlier, the output signal L of the de-bounce sub-circuit becomes instantly high, if the output signal NLi of the sub-circuit SnL is low. The delay circuit C may be implemented as a counter and it reset at its reset terminal on which the signal NLi is applied to.

The output signal L of the de-bounce sub-circuit Deb is applied to the current sensing circuit 400 and particularly to switch 417 of circuit 400. The signal L is also used to change the gain factor of the current sensing block, if necessary.

Figure 6A:
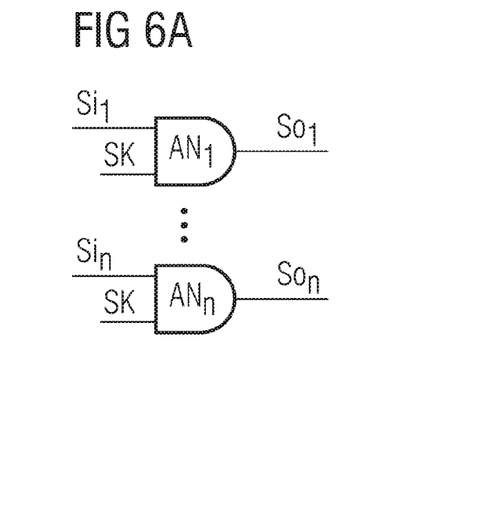
FIGS. 6A, 6B illustrate some sub-circuits within the skip controller.
Figure 6B:
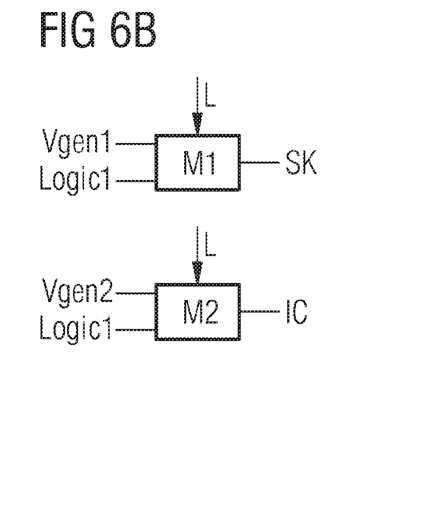

The signal L is applied to the skip controller sub-circuit 22a. Some elements of the skip controller sub-circuit 22a are shown in FIG. 6A with respect to sub-figures A and B. The input signals from the digital signal generation block are applied to respective input terminals of a plurality of logic AND gates $AN_1$ to $AN_n$. The respective second input terminals of the logic AND gates receive the signal SK indicating the SKIP mode of the charge pump arrangement. Said signal SK of the charge pump arrangement is generated in some multiplexer units M1, M2.

Figure 10:
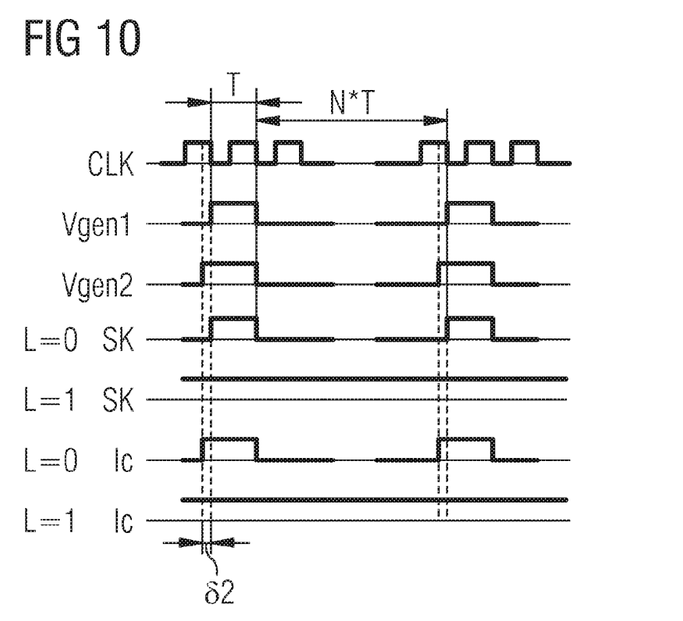
FIG. 10 shows some signals applied to the skip controller to control the different modes of operation.

FIG. 10 shows the respective signals for different modes of operation, i.e. SKIP mode of operation and a continuous mode of operation.

Signal SK indicating the continuous mode of operation is generated using a multiplexer M1 with its input terminal receiving the voltage generation Vgen1, generated from the clock signal CLK, a logic signal and the mode control signal L equals. During SKIP mode, signal SK is a pulsed signal with a period of N*T, wherein N is a predetermined constant integer value and equals the number of skipped periods of clock signal CLK.

To further reduce power consumption, an additional control signal IC for the current source of the driver and output voltage controller 22b is generated using multiplexer M2.

During a continuous mode of operation, L=1, the control signal IC for bias control of the driver and output voltage controller equals 1, representing a high bias current.

Figure 8:
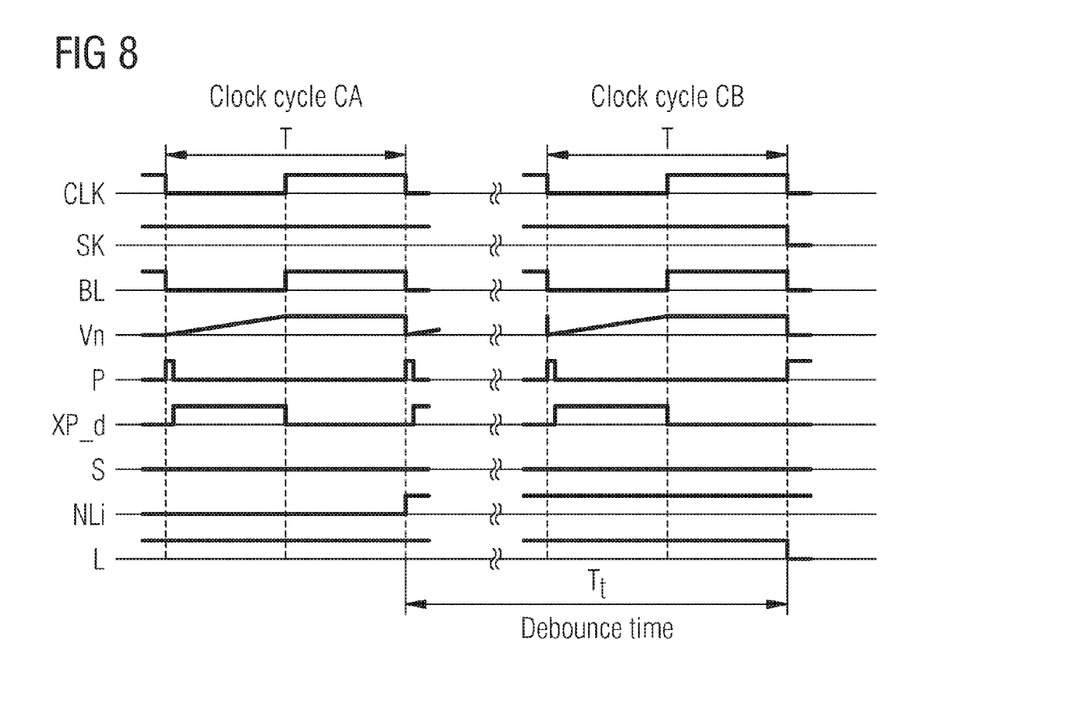
FIG. 8 illustrates some signals over time during the transition from the first mode of operation to the second mode of operation.

FIG. 8 illustrates a transition diagram of several signals from the continuous mode of operation to the non-continuous, i.e. the SKIP mode of operation of the charge pump arrangement.

During a clock cycle CA, signal SK is high while signal BL used for switch S3 follows the clock signal CLK. At the beginning of the clock cycle CA, a pulsed signal P is generated discharging capacitor Cr. Then, switch S1 is closed charging capacitor Cr in FIG. 4 to reference voltage Vn at the end of the first half of clock cycle CA. Comparator CP1 in FIG. 4 now compares reference voltage Vn with voltage Vp corresponding to the integrated sensed current Is. As previously explained, output signal NLi of sub-circuit SnL goes high at the next clock edge, in this case, the end of clock cycle CA. However, if NLi is at high value, output signal L does not immediately go to a low level but after the defined de-bounce time $T_t$ specified by delay circuit C. At the end of clock cycle CB, the signal SK goes low initiating the non-continuous mode of operation.

Signal SK will now change its state after n periods of the clock cycle given by the latch in the SnL sub-circuit. A transition from a non-continuous mode of operation to a continuous mode of operation indicated by a transition ff mode control signal L from 0 to 1 may occur in two different cases.

For instance, as previously explained with respect to the sub-circuit LdVoDet, output signal Si2 of the voltage sensing sub-circuit LdVoDet may increase to high value indicating that a voltage drop has crossed a threshold. Alternately, the differential current sensing means may indicate that a load has drawn too much current crossing a threshold current defined by sub-circuit Int1.

Figure 9:
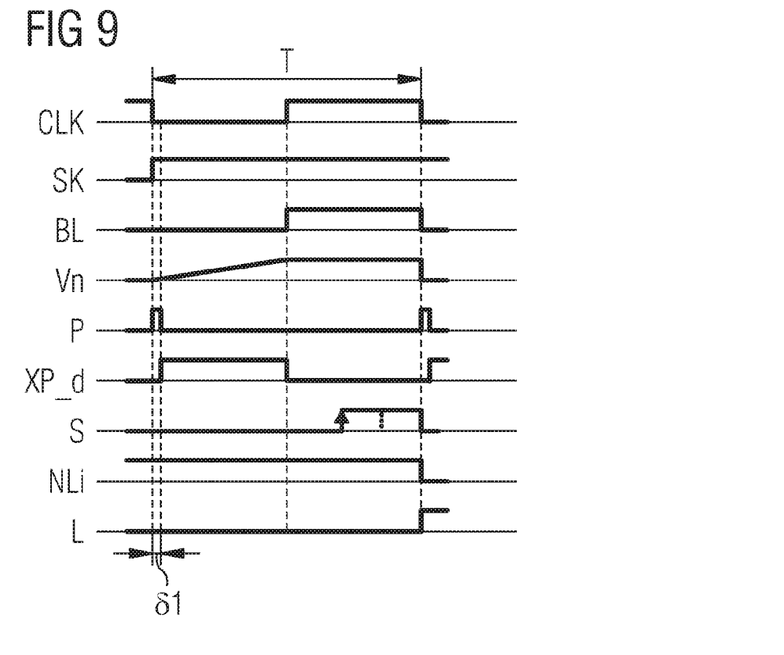
FIG. 9 illustrates signals during the transition from the second mode of operation to the first mode of operation.

In the example of FIG. 9, intermediate signal S within sub-circuit SnL goes high in the middle of the second half of the period of the clock signal CLK. This will set the output signal NLi of the sub-circuit SnL at the end of the clock cycle to low value, thereby automatically resetting counter C in the de-bounce sub-circuit. As a result, signal L at the output of the de-bounce circuit will go high.

Figure 7:
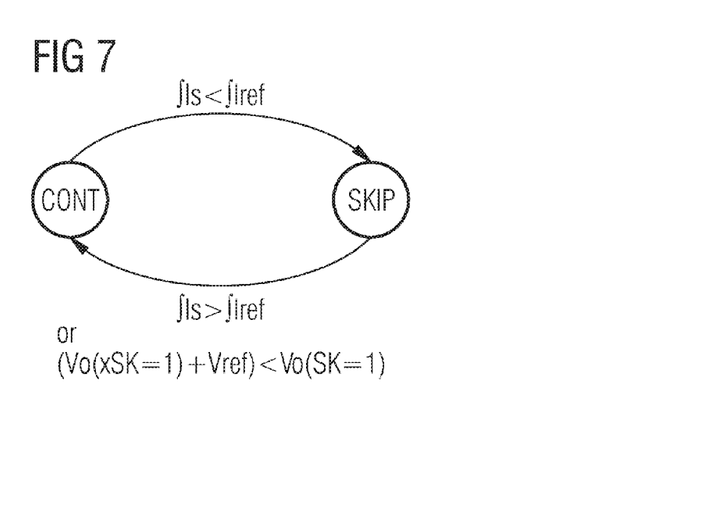
FIG. 7 shows a state machine indicating an embodiment of the proposed method.

Finally, FIG. 7 shows an embodiment of a state machine according to the controlled charge pump arrangement of the present invention.

During operation of the controlled charge pump, the charge pump is operated in a continuous mode indicated as CONT or a non-continuous mode indicated as SKIP. During the continuous mode, switching signals are applied to the charge pump with respect to an externally applied clock signal. During a non-continuous mode, pulse driving signals are generated with respect to the clock signal as well. However, the driving pulses for the charge pump are generated only in specific periods of the clock signal. For instance, pulse driving signals for the charge pump may be generated after n times of the clock period.

To determine whether to change from the CONT mode to the SKIP mode or vice-versa, the switching current through one of the switches of the charge pump used for charging or discharging the respective capacitor of the charge pump is measured and compared to a reference value. In addition, the output voltage at the end of each driving pulse is determined and then compared with the current output voltage plus a reference voltage. Since the charging current Isns measured in circuit 400 of FIG. 3 and the measured current is a pulsed signal, it will be useful to compare the "integrated" current given by Vp with an "integrated" reference current corresponding to signal Vn.

A transition from SKIP mode to a CONT mode is initiated in two different cases. First, a transition is initiated if the switching current Is or a signal proportional to the switching current Is becomes bigger than a respective reference current Iref or a signal proportional to the reference current. Alternately, a transition from SKIP mode to CONT mode is initiated, if the voltage at the output of the charge pump plus a reference voltage drops below a threshold value. Said threshold value is given by the voltage at the output terminal of the charge pump after its latest driving pulse.

A transition from CONT mode to SKIP mode is initiated not in response to a voltage sensing but in response to a current sensing. Particularly, the SKIP mode is initiated if the switching current or a signal proportional to the switching current is smaller than the reference current or a signal proportional to the reference current. Current sensing in CONT mode is preferred above voltage sensing, because in unregulated charge pumps, an output voltage may not be constant. Accordingly, a transition can be still initiated if the switching current is lower than the reference current.

In this respect, it should be noted that the switching current is proportional to the current drawn by a load applied to the charge pump. In a non-continuous SKIP mode, the switches are not continuously operated. Hence, the voltage sensing along with current sensing can be used to initiate a transition to a continuous mode of operation when a change in the load applied to the output of the charge pump is detected. The unregulated output voltage can still change very slowly, even with a load applied to the output of the charge pump. Still, a transition to a continuous mode can be achieved in one clock cycle due to the current sensing.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. A controlled charge pump arrangement, comprising:
   a clocked operated charge pump having an output terminal to provide an output voltage;
   a first sub-circuit coupled to the output terminal of the clocked operated charge pump and adapted to provide a first control signal in response to a comparison of the output voltage with a first reference signal;
   a second sub-circuit coupled to the clocked operated charge pump and adapted to provide a second control signal in response to a comparison of a signal with a second reference signal, said signal being different from the output voltage and derived by a switch current within the clocked operated charge pump; and
   a clock skip controller adapted to control a mode of operation of the clocked operated charge pump in response to said first and second control signals,
   wherein the second sub-circuit comprises a current mirror, its current mirror transistor coupled to the charge pump switch to mirror a current through the switch and an equalizing network, said equalizing network comprising a differential amplifier connected to said charge pump switch and to a sensing transistor, said charge pump switch and sensing transistor receiving the same switching signal.

2. The charge pump arrangement according to claim 1, wherein said clock skip controller is adapted to control the provision of a clock signal to the clocked operated charge pump or the generation of said clock signal.

3. The charge pump arrangement according to claim 1, wherein said switch current is derived by a charge pump capacitor's charging or discharging current.

4. The charge pump arrangement according to claim 1, wherein the clocked operated charge pump comprises an operation mode out of a first mode of operation and a second mode of operation, wherein in the first mode the clocked operated charge pump is operated continuously with respect to a clock signal, and wherein in the second mode of operation the clocked operated charge pump is operated non-continuously with respect to the clock signal such that driving pulses for the clocked operated charge pump are not generated during one or more skipped periods of the clock signal.

5. The charge pump arrangement according to claim 4, wherein the clock skip controller is adapted to initiate the second mode of operation in response to the second control signal and to initiate the first mode of operation in response to the first control signal or the second control signal.

6. The charge pump arrangement according to claim 1, wherein the clock skip controller is adapted to control the mode of operation of the clocked operated charge pump upon detection of a drop on the output voltage at the output terminal below a threshold or upon detection of a current drawn from the clocked operated charge pump above a threshold.

7. The charge pump arrangement according to claim 1, wherein the clock skip controller is adapted to initiate a transition between different modes of operation synchronously with respect to a clock signal applied to the charge pump arrangement.

8. The charge pump arrangement according to claim 1, wherein the clock skip controller comprises a de-bounce circuitry, at least adapted to initiate a delayed transition from a first mode of operation to a second mode of operation by a predefined number of periods of a clock signal.

9. The charge pump arrangement according to claim 1, wherein the first sub-circuit comprises a storage element for storing an output voltage of the clocked charge pump during a first mode of operation, said voltage corresponding to the first reference signal and a comparator coupled to said capacitor.

10. The charge pump arrangement according to claim 1, wherein the second sub-circuit or the skip-controller comprises an over-current detection circuit adapted to detect a switch current above a threshold and to clamp the second control signal to a specific value upon over-current detection.

11. A method for controlling a clocked charge pump, said charge pump comprising an operation mode out of a first mode and a second mode, wherein in the first mode the clocked charge pump is operated continuously with respect to a clock signal and in the second mode the clocked charge pump is operated non-continuously with respect to the clock signal such that driving pulses for the clocked charge pump are not generated during one or more skipped periods of the clock signal, the method comprising:
   sensing an output voltage of the clocked charge pump;
   comparing the output voltage with a first reference signal to provide a first control signal;
   sensing a switching current of the charge pump during operation of the clocked charge pump;
   comparing the switching current or a signal different from the output voltage and derived from the switching current with a second reference signal to provide a second control signal; and
   changing an operation mode of the clocked charge pump in response to the first and/or second control signals,
   wherein changing the operation mode comprises at least one of the following:

initiating a transition from the first mode to the second mode when the switching current or a signal derived from the switching current is smaller than the second reference signal;

initiating a transition from the second mode to the first mode when the switching current or a signal derived from the switching current is greater than the second reference signal;

initiating a transition from the second mode to the first mode when an output voltage during the second mode is smaller than the second reference signal; and initiating a transition from the second mode to the first mode when an output voltage during the second mode is smaller than an output voltage during the preceding continuous mode.

12. The method according to claim 11, wherein changing the operation mode comprises delaying a transition from the first mode to the second mode for a predefined number of periods of the clock signal.

13. The method according to claim 11, wherein the operation mode is changed synchronously with the clock signal and at the end of a period of the clock signal.

14. The charge pump arrangement according to claim 4, wherein the mode of operation of the clocked operated charge pump comprises at least one of the following:

an operational mode for initiating a transition from the first mode to the second mode when the switching current or a signal derived from the switching current is smaller than the second reference signal;

an operational mode for initiating a transition from the second mode to the first mode when the switching current or a signal derived from the switching current is greater than the second reference signal;

an operational mode for initiating a transition from the second mode to the first mode when an output voltage during the second mode is smaller than the second reference signal; and an operational mode for initiating a transition from the second mode to the first mode when an output voltage during the second mode is smaller than an output voltage during the preceding continuous mode.

* * * * *